(12) United States Patent
Jeon et al.

(10) Patent No.: US 10,346,871 B2
(45) Date of Patent: Jul. 9, 2019

(54) AUTOMATIC TARGETING OF CONTENT BY CLUSTERING BASED ON USER FEEDBACK DATA

(71) Applicant: Facebook, Inc., Menlo Park, CA (US)

(72) Inventors: Sung-eok Jeon, Bellevue, WA (US); Aliasgar Mumtaz Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 386 days.

(21) Appl. No.: 15/136,814

(22) Filed: Apr. 22, 2016

(65) Prior Publication Data

US 2017/0308924 A1 Oct. 26, 2017

(51) Int. Cl.
 *G06Q 30/00* (2012.01)
 *G06Q 30/02* (2012.01)
(52) U.S. Cl.
 CPC ..... *G06Q 30/0244* (2013.01); *G06Q 30/0251* (2013.01); *G06Q 30/0261* (2013.01); *G06Q 30/0269* (2013.01)
(58) Field of Classification Search
 CPC .................. G06Q 30/0244; G06Q 30/0251
 See application file for complete search history.

(56) References Cited

U.S. PATENT DOCUMENTS

| | | | | |
|---|---|---|---|---|
| 5,754,939 A | * | 5/1998 | Herz | G06Q 20/383 348/E7.056 |
| 6,134,532 A | * | 10/2000 | Lazarus | G06Q 30/02 705/14.25 |
| 6,286,005 B1 | * | 9/2001 | Cannon | G06Q 30/02 455/2.01 |
| 7,003,476 B1 | * | 2/2006 | Samra | G06Q 10/0635 705/7.28 |
| 7,130,808 B1 | * | 10/2006 | Ranka | G06Q 10/06315 705/14.43 |
| 7,370,002 B2 | * | 5/2008 | Heckerman | G06Q 30/02 705/14.41 |
| 7,406,434 B1 | * | 7/2008 | Chang | G06Q 10/06375 705/14.43 |
| 7,472,102 B1 | * | 12/2008 | Heckerman | G06Q 10/087 706/45 |
| 7,567,958 B1 | * | 7/2009 | Alspector | G06Q 30/0255 |

(Continued)

*Primary Examiner* — Luis A Brown
(74) *Attorney, Agent, or Firm* — Fenwick & West LLP (57) ABSTRACT

An online system automatically and dynamically determines an audience for content by clustering users across various dimensions, and refining targeting criteria for the content. The online system receives content and initial targeting criteria from a content provider. The content is provided to a group of users that meet the initial targeting criteria. The system collects content response data from the group of users that were provided the content, including user responses to the content and dynamic data relating to time and location of the user responses. The content response data is further integrated with user characteristics, content presentation data, and social response data to generate integrated user-content data of the content. Clusters of users are generated based on features of the integrated user-content data, and refined targeting criteria are identified based on the generated clusters that can then be used for more accurate targeting of the content to users.

30 Claims, 7 Drawing Sheets

(56) References Cited

U.S. PATENT DOCUMENTS

| | | | | |
|---|---|---|---|---|
| 7,941,525 B1* | 5/2011 | Yavilevich | G06Q 30/02 709/203 |
| 8,438,184 B1* | 5/2013 | Wang | H04L 67/02 707/780 |
| 8,725,570 B2* | 5/2014 | Doughty | G06Q 30/0269 705/14.4 |
| 9,342,597 B1* | 5/2016 | Tomkins | G06F 16/3331 |
| 2002/0072965 A1* | 6/2002 | Merriman | G06Q 30/02 705/14.49 |
| 2003/0009497 A1* | 1/2003 | Yu | G06Q 10/10 715/256 |
| 2003/0049839 A1* | 3/2003 | Romero-Ortega | C12N 5/0068 435/397 |
| 2003/0093792 A1* | 5/2003 | Labeeb | H04N 7/163 725/46 |
| 2003/0176931 A1* | 9/2003 | Pednault | G06K 9/6219 700/31 |
| 2005/0235030 A1* | 10/2005 | Lauckhart | G06Q 30/02 709/200 |
| 2005/0240580 A1* | 10/2005 | Zamir | H04L 67/22 |
| 2007/0005425 A1* | 1/2007 | Bennett | G06Q 30/02 705/14.73 |
| 2007/0038516 A1* | 2/2007 | Apple | G06Q 30/02 705/14.42 |
| 2007/0073585 A1* | 3/2007 | Apple | G06Q 30/02 705/14.46 |
| 2007/0136256 A1* | 6/2007 | Kapur | G06Q 30/02 |
| 2007/0178914 A1* | 8/2007 | Montenegro | G01S 5/0252 455/456.5 |
| 2007/0244741 A1* | 10/2007 | Blume | G06Q 30/02 705/7.31 |
| 2007/0282785 A1* | 12/2007 | Fayyad | G06Q 30/0207 |
| 2008/0004959 A1* | 1/2008 | Tunguz-Zawislak | G06Q 20/102 705/14.67 |
| 2008/0005073 A1* | 1/2008 | Meek | G06F 16/9535 |
| 2008/0033784 A1* | 2/2008 | Chalimadugu | G06Q 30/02 705/7.29 |
| 2008/0086368 A1* | 4/2008 | Bauman | G06Q 30/02 705/7.34 |
| 2008/0086741 A1* | 4/2008 | Feldman | G06Q 30/02 725/13 |
| 2008/0098420 A1* | 4/2008 | Khivesara | G06Q 30/02 725/32 |
| 2008/0103887 A1* | 5/2008 | Oldham | G06Q 30/02 705/14.71 |
| 2008/0109306 A1* | 5/2008 | Maigret | G06F 21/10 705/14.46 |
| 2008/0162206 A1* | 7/2008 | Mak | G06Q 30/02 705/14.53 |
| 2008/0183558 A1* | 7/2008 | Koran | G06Q 30/02 705/14.54 |
| 2008/0189169 A1* | 8/2008 | Turpin | G06Q 30/02 705/7.33 |
| 2008/0249855 A1* | 10/2008 | Collins | G06Q 30/00 705/14.54 |
| 2008/0262913 A1* | 10/2008 | Reitz | G06Q 30/02 705/14.36 |
| 2008/0275861 A1* | 11/2008 | Baluja | G06N 5/02 |
| 2008/0281694 A1* | 11/2008 | Kretz | G06Q 30/02 705/14.64 |
| 2008/0281817 A1* | 11/2008 | White | G06F 16/9535 |
| 2009/0006363 A1* | 1/2009 | Canny | G06Q 30/02 |
| 2009/0055375 A1* | 2/2009 | Oestlien | G06F 16/958 |
| 2009/0063250 A1* | 3/2009 | Burgess | G06Q 30/02 705/14.52 |
| 2009/0063268 A1* | 3/2009 | Burgess | G06Q 30/02 705/14.39 |
| 2009/0063984 A1* | 3/2009 | Agarwal | G06Q 30/02 715/733 |
| 2009/0125350 A1* | 5/2009 | Lessing | G06Q 10/0631 705/7.12 |
| 2009/0125444 A1* | 5/2009 | Cochran | G06Q 30/0185 705/50 |
| 2009/0138447 A1* | 5/2009 | Kalavade | G06Q 10/0637 |
| 2009/0259533 A1* | 10/2009 | Utter | G06Q 30/02 705/14.27 |
| 2009/0271255 A1* | 10/2009 | Utter | G06Q 30/02 705/14.1 |
| 2009/0282034 A1* | 11/2009 | Goronzy | H04H 60/46 |
| 2009/0299967 A1* | 12/2009 | Li | G06Q 30/02 |
| 2010/0030647 A1* | 2/2010 | Shahshahani | G06Q 30/02 705/14.66 |
| 2010/0049602 A1* | 2/2010 | Softky | G06Q 30/00 705/14.45 |
| 2010/0076850 A1* | 3/2010 | Parekh | G06Q 30/02 705/14.66 |
| 2010/0082423 A1* | 4/2010 | Nag | G06Q 30/02 705/14.43 |
| 2010/0088152 A1* | 4/2010 | Bennett | G06Q 30/02 705/14.19 |
| 2010/0088177 A1* | 4/2010 | Lu | G06Q 30/02 705/14.43 |
| 2010/0281025 A1* | 11/2010 | Tsatsou | G06F 16/335 707/733 |
| 2011/0035272 A1* | 2/2011 | Bhatt | G06Q 30/02 705/14.42 |
| 2011/0106631 A1* | 5/2011 | Lieberman | G06Q 30/02 705/14.72 |
| 2011/0137721 A1* | 6/2011 | Bansal | G06Q 30/02 705/14.41 |
| 2012/0150645 A1* | 6/2012 | Mandyam | G06Q 30/0256 705/14.54 |
| 2012/0226563 A1* | 9/2012 | Lu | G06Q 30/02 705/14.66 |
| 2012/0284128 A1* | 11/2012 | Wang | G06Q 30/00 705/14.71 |
| 2013/0124309 A1* | 5/2013 | Traasdahl | H04L 67/22 705/14.49 |
| 2014/0129560 A1* | 5/2014 | Grokop | G06N 5/043 707/737 |
| 2014/0149440 A1* | 5/2014 | Mason | G06Q 10/0631 707/758 |
| 2014/0237496 A1* | 8/2014 | Julian | H04N 21/44213 725/13 |
| 2014/0278920 A1* | 9/2014 | Holden | G06Q 30/0245 705/14.44 |
| 2015/0193815 A1* | 7/2015 | Juda | G06Q 30/0244 705/14.43 |
| 2015/0213488 A1* | 7/2015 | Karande | G06Q 30/0246 705/14.45 |
| 2015/0235275 A1* | 8/2015 | Shah | G06Q 30/0269 705/14.66 |
| 2015/0363826 A1* | 12/2015 | Tseng | G06Q 30/0259 705/14.57 |
| 2016/0063538 A1* | 3/2016 | Srivastava | G06Q 30/0244 705/14.43 |
| 2016/0182657 A1* | 6/2016 | Mukherjee | H04L 67/22 709/223 |

* cited by examiner

*Content Response Data for Heart Bracelet by Jewelry Inc.*

| User # | Interaction | Conversion | Interaction Local Time | Weekend Conversion | Conversion Distance (km) | Interaction Location of User |
|---|---|---|---|---|---|---|
| 1 | 0 | 0 | 10:08 | -- | -- | -- |
| 2 | 1 | 0 | 20:56 | -- | -- | home |
| 3 | 1 | 1 | 21:47 | 1 | 9.6 | home |
| 4 | 0 | 0 | 16:03 | -- | -- | -- |
| 5 | 1 | 1 | 15:04 | -- | -- | school |
| 6 | 1 | 0 | 12:34 | 0 | 3.5 | work |
| 7 | 0 | 1 | 15:48 | 1 | 1 | -- |
| 8 | 1 | 0 | 06:34 | -- | -- | school |

*FIG. 4*

*Integrated User-Content Data for Heart Bracelet by Jewelry Inc.*

| User # | Gender | No. of Posts w/ 'Bracelet' | Age (Yrs.) | Presentation Local Time | Network Converts | Weekend Conversion | Interaction | Conversion |
|---|---|---|---|---|---|---|---|---|
| 1 | F | Italy | 37 | 10:08 | 3 | -- | 0 | 0 |
| 2 | M | England | 87 | 20:56 | 8 | -- | 1 | 0 |
| 3 | M | France | 54 | 21:47 | 1 | 1 | 1 | 1 |
| 4 | F | USA | 34 | 16:03 | 5 | -- | 0 | 0 |
| 5 | F | China | 18 | 15:04 | 9 | -- | 1 | 0 |
| 6 | M | France | 13 | 12:34 | 10 | 0 | 1 | 1 |
| 7 | M | Korea | 65 | 15:48 | 2 | 1 | 0 | 1 |
| 8 | F | USA | 17 | 06:34 | 3 | -- | 1 | 0 |

User Characteristics | Sponsored Item Presentation Conditions | Social Response Data | Content Response Data

AUTOMATIC TARGETING OF CONTENT BY CLUSTERING BASED ON USER FEEDBACK DATA

BACKGROUND

This invention relates generally to identifying targeting criteria for content, and more particularly to automatically and dynamically identifying refined targeting criteria based on user responses to the content.

It is advantageous for content providers in online systems, such as social networking systems, to identify targeting criteria that will lead to increased interaction by users with the content or increased conversion resulting from content. Content providers commonly provide targeting criteria along with the content itself to online systems for presentation of the content to users. The initial targeting criteria provided by the content provider typically include information, such as age, gender, and region of residence for a user, or may include specific targeting time ranges for the content. Often times, the targeting criteria specified by the content provider may be fairly basic, static information, and may fail to include other more dynamic targeting criteria that result in effective responses for the content.

SUMMARY

An online system, such as a social networking system, performs automatic and dynamic determination of audiences to target for each individual content item it receives from a content provider. Through clustering of users across various dimensions and by using dynamic information about user interactions with content (e.g., conversion timestamps, conversion locations, etc.) as features to build a richer model, the online system can refine targeting criteria provided by a content provider for a particular piece of content to perform more accurate targeting for that particular content and determine an optimal audience specific to the content.

The online system receives a sponsored content item and initial targeting criteria from a sponsored content provider. The initial targeting criteria include a set of rules for targeting the sponsored content to users of the online system. These initial targeting criteria from the content provider can be demographic information the audience to whom the content provider wishes to target the content, such as males between the ages of 25 and 35. The sponsored content item is then provided to a group of users that meet the initial targeting criteria over a period of time. The content provider system collects content response data from the group of users that were provided the sponsored content item. The content response data includes user responses to the sponsored content item and dynamic data relating to the time and location of the user responses. The user responses indicate whether a user interacted with the content item, converted based on the content item, or remained inactive after being presented with the content item. Dynamic data relates to the time and location of the user responses to the content item. For example, the dynamic data may include proximity of a user's mobile device to a physical location related to the content item when the user interacted with the content item or made a purchase related to a product in the content item.

The content response data is further integrated with corresponding user characteristics, presentation conditions of the sponsored content item, and social response data to generate integrated user-content data. The user characteristics include data from user profiles of the users, actions taken by the users, and connections of the users with other users in the online system. Content item presentation conditions include conditions related to when the content was served to the user. Social response data include information on how other users associated with the user responded to the content item or similar content. One or more clusters of users are generated based on the integrated user-content data for the content item. Each different content item can have its own set of user clusters determined by the system that are used in defining audiences specific to that content item. The content item is then targeted to users based on refined targeting criteria extracted from the one or more clusters that are specific to that sponsored content item.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
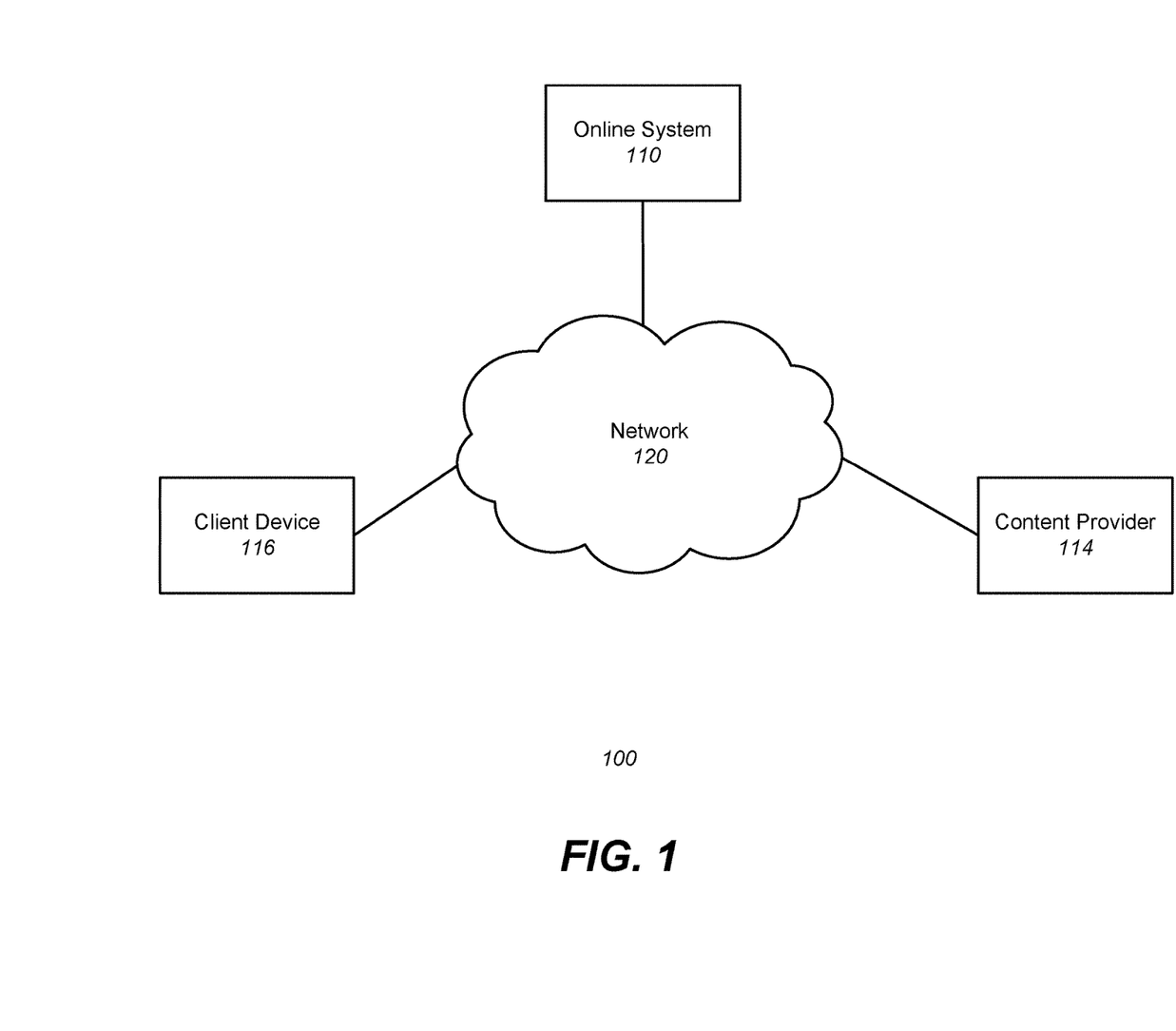
FIG. 1 is a high level block diagram of a system environment for an online system, in accordance with an embodiment.

FIG. 1 is a high level block diagram of a system environment for an online system, such as a social networking system, in accordance with an embodiment. The system environment 100 shown by FIG. 1 comprises one or more client devices 116, a network 120, one or more content providers 114, and the online system 110. In alternative configurations, different and/or additional components may be included in the system environment 100. The embodiments described herein can be adapted to online systems that are not social networking systems, such as advertising systems or ad publishing systems.

The client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the online system 110. For example, a client device 116 executes a browser application to enable interaction between the client device 116 and the online system 110 via the network 120. In another embodiment, the client device 116 interacts with the online system 110 through an application programming interface (API) running on a native operating system of the client device 116, such as IOS® or ANDROID™.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more content providers 114 may be coupled to the network 120 for communicating with the online system 110. The content providers 114 are one or more entities interested in promoting the subject of the sponsored content item ("sponsored item"). The subject of the sponsored item may be, for example, a product, a cause, or an event. The content providers 114 may be a business or organization associated with the sponsored item that owns or manages the subject of the sponsored item, or may be an agency hired by the business or entity to promote the subject of the sponsored item. In one particular embodiment referred to throughout the application, a sponsored content item may be an advertisement provided by an advertiser, but is not limited thereto.

The content providers 114 provide one or more sponsored content item requests ("sponsored item requests") to the online system 110 that include sponsored items to be served to the client devices 116. The sponsored item requests provided by the content providers 114 include the sponsored content item and targeting criteria specified by the content providers 114 among other components, and are stored in the online system 110.

The content providers 114 may also specify a campaign containing a series of sponsored items to the online system 110. The sponsored items in a campaign contain different content but commonly share a single theme. For example, a series of sponsored items in a campaign may promote the same product, business, or organization but with various forms of content. In one particular embodiment referred to throughout the remainder of the specification, a sponsored item may refer to a single item, or may refer to any sponsored item in a series of items for a campaign.

Online System

Figure 2:
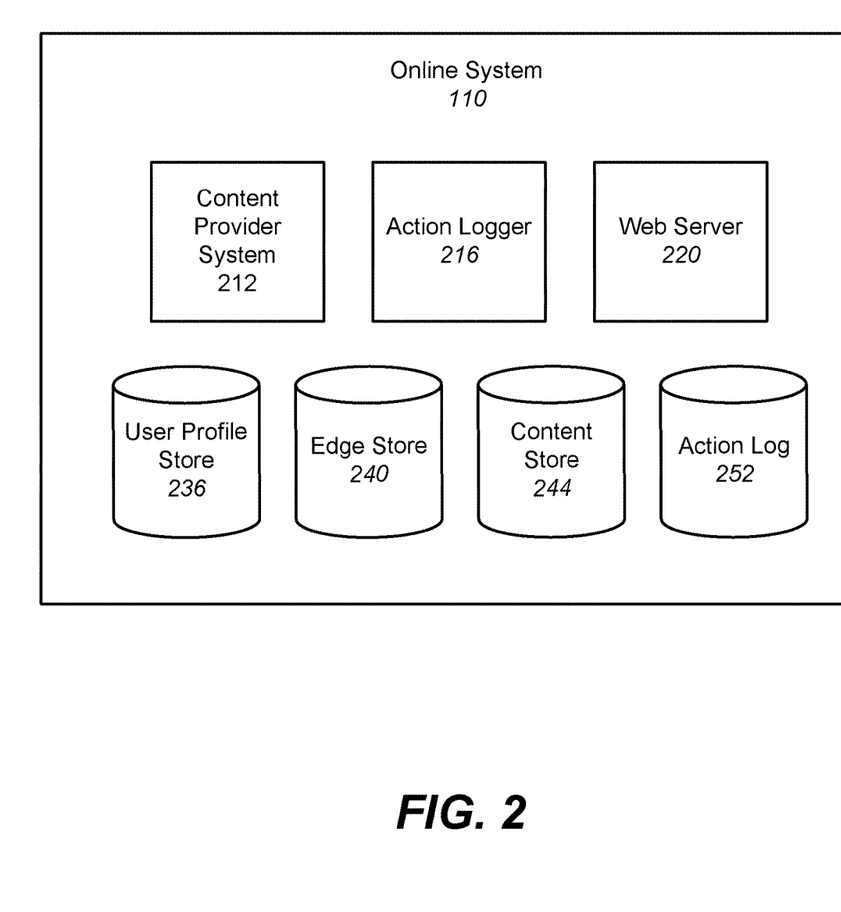
FIG. 2 is an example block diagram of an architecture of an online system, in accordance with an embodiment.

FIG. 2 is an example block diagram of an architecture of the online system 110. The online system 110 shown in FIG. 2 includes a user profile store 236, an edge store 240, a social content store 244, an action log 252, a content provider system 212, an action logger 216, and a web server 220. In other embodiments, the online system 110 may include additional, fewer, or different components for various applications. Conventional components such as network interfaces, security functions, load balancers, failover servers, management and network operations consoles, and the like are not shown so as to not obscure the details of the system architecture. In the example provided below, the online system 110 includes various social networking and advertising components, though other embodiments may not relate to social networking or may not relate to advertising.

Each user of the online system 110 is associated with a user profile, which is stored in the user profile store 236. A user profile includes declarative information about the user that was explicitly shared by the user and may also include profile information inferred by the online system 110. In one embodiment, a user profile includes multiple data fields, each describing one or more attributes of the corresponding user of the online system 110. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 110 displayed in an image. A user profile in the user profile store 236 may also maintain references to actions by the corresponding user performed on content items in the social content store 244 and are stored in the action log 252.

While user profiles in the user profile store 236 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The social content store 244 stores objects that each represents various types of social content. Examples of social content represented by an object include a page post, a status update, a photograph, a video, a link, a shared content item, a gaming application achievement, a check-in event at a local business, a brand page, or any other type of content. Online system users may create objects stored by the social content store 244, such as status updates, photos tagged by users to be associated with other objects in the online system 110, events, groups or applications. In some embodiments, objects are received from third-party applications or third-party applications separate from the online system 110. In one embodiment, objects in the content store 244 represent single pieces of social content, or social content "items." Hence, users of the online system 110 are encouraged to communicate with each other by posting text and social content items of various types of media through various communication channels. This increases the amount of interaction of users with each other and increases the frequency with which users interact within the online system 110.

The action logger 216 receives communications about user actions internal to and/or external to the online system 110, populating the action log 252 with information about user actions. Examples of actions include adding a connection to another user, sending a message to another user, uploading an image, reading a message from another user, viewing social content associated with another user, attending an event posted by another user, among others. In addition, a number of actions may involve an object and one or more particular users, so these actions are associated with those users as well and stored in the action log 252.

The action log 252 may be used by the online system 110 to track user actions on the online system 110, as well as actions on third party systems that communicate information to the online system 110. Users may interact with various objects on the online system 110, and information describing these interactions is stored in the action log 252. Examples of interactions with objects include: commenting on posts, sharing links, and checking-in to physical locations via a mobile device, accessing content items, and any other interactions. Additional examples of interactions with objects on the online system 110 that are included in the action log 252 include: commenting on a photo album, communicating with a user, establishing a connection with an object, joining an event to a calendar, joining a group, creating an event, authorizing an application, using an application, expressing a preference for an object ("liking" the object) and engaging in a transaction. In some embodiments, data from the action log 252 is used to infer interests or preferences of a user, augmenting the interests included in the user's user profile and allowing a more complete understanding of user preferences.

The action log 252 may also store user actions taken on a third party system, such as an external website, and communicated to the online system 110. For example, an e-commerce website that primarily sells sporting equipment at bargain prices may recognize a user of an online system 110 through a social plug-in enabling the e-commerce website to identify the user of the online system 110. Because users of the online system 110 are uniquely identifiable, e-commerce websites, such as this sporting equipment retailer, may communicate information about a user's actions outside of the online system 110 to the online system 110 for association with the user. Hence, the action log 252 may record information about actions users perform on a third party system, including webpage viewing histories, advertisements that were engaged, purchases made, and other patterns from shopping and buying.

In one embodiment, an edge store 240 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 110, such as expressing interest in a page on the online system 110, sharing a link with other users of the online system 110, and commenting on posts made by other users of the online system 110.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 110, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The content provider system 212 provides and presents sponsored items to users of the online system 110 through client devices 116. The content provider system 212 initially targets a sponsored content item to users of client devices 116 based on initial targeting criteria specified by the content providers 114. The content provider system 212 further collects user response data to a sponsored item and refines the targeting criteria for the sponsored item based on the collected response data from users that were presented with the item. The sponsored item is then targeted to additional users of client devices 116 based on the refined targeting criteria. A more detailed embodiment of the content provider system 212 is provided below in conjunction with FIG. 3.

The web server 220 links the online system 110 via the network 120 to the one or more client devices 116, as well as to the one or more third party systems. The web server 220 serves web pages, as well as other web-related content, such as JAVA®, FLASH®, XML and so forth. The web server 220 may receive and route messages between the online system 110 and the client device 116, for example, instant messages, queued messages (e.g., email), text messages, short message service (SMS) messages, or messages sent using any other suitable messaging technique. A user may send a request to the web server 220 to upload information (e.g., images or videos) that are stored in the social content store 244. Additionally, the web server 220 may provide application programming interface (API) functionality to send data directly to native client device operating systems, such as IOS®, ANDROID™, WEBOS® or RIM®.

Content Provider System

Figure 3:
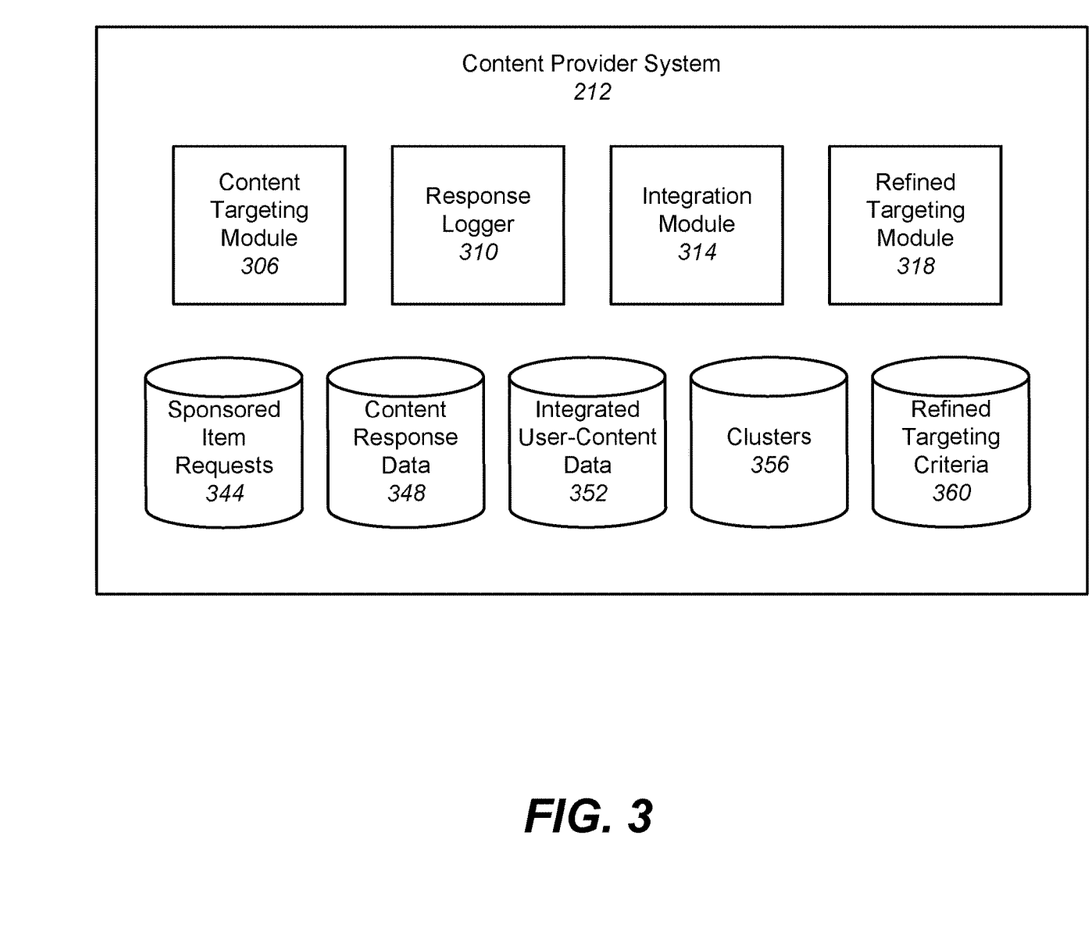
FIG. 3 is an example block diagram of an architecture of the content provider system, in accordance with an embodiment.

FIG. 3 is an example block diagram of an architecture of the content provider system 212. The content provider system 212 shown in FIG. 3 includes content targeting module 306, an response logger 310, an integration module 314, and a refined targeting module 318. The content provider system 212 also includes sponsored item requests 344, content response data 348, integrated user-content data 352, clusters 356, and refined targeting criteria 360. In other embodiments, the content provider system 212 may include additional, fewer, or different components for various applications. Conventional components such as network interfaces, security functions, load balancers, failover servers, management and network operations consoles, and the like are not shown so as to not obscure the details of the system architecture.

Content Targeting Module

The content targeting module 306 receives sponsored item requests 344 provided by the content providers 114, identifies a presentation opportunity for a user based on the initial targeting criteria specified in sponsored item requests 344, and serves the sponsored content item to the client device 116 of the user.

An sponsored item request 344 includes the sponsored content associated with the subject of the item, a bid amount or a budget specified by the content provider 114, and initial targeting criteria specified by the content provider 114. The sponsored item is text, image, audio, video, or any other suitable data presented to a user. In various embodiments, the sponsored content also includes a landing page specifying a network address to which a user is directed when the sponsored item is accessed.

The bid amount for sponsored item specified by a content provider 114 is used to determine an expected value, such as monetary compensation, provided by a content provider 114 to the online system 110 if the sponsored item is presented to a user, if the sponsored item receives a user interaction, or based on any other suitable condition. For example, the bid amount specifies a monetary amount that the online system 110 receives from the content provider 114 if the sponsored item is displayed and the expected value is determined by multiplying the bid amount by a probability of the sponsored item being accessed. In some cases, the content provider 114 may not provide a bid amount, but may instead provide a budget for a sponsored item or campaign, and the online system 110 determines how best to spend the budget and what amount to bid for presenting the sponsored item to users meeting the initial targeting criteria.

A sponsored item request 344 may include initial targeting criteria specified by the content provider 114 that contain one or more rules for targeting the sponsored item. Targeting criteria included in a sponsored item request 344 may specify one or more characteristics of users eligible to be presented with the sponsored content in the sponsored item request 344. For example, targeting criteria may be a filter to apply to fields of a user profile, edges, and/or actions associated with a user to identify users having user profile information, edges, or actions satisfying at least one of the targeting criteria. Hence, the initial targeting criteria allow a content provider 114 to identify groups of users matching specific targeting criteria, simplifying subsequent distribution of content to groups of users.

In one embodiment, the targeting criteria may specify actions or types of connections between a user and another user or object of the online system 110. The targeting criteria may also specify interactions between a user and objects performed external to the online system 110, such as on a third party system. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system, or any other suitable action. Including actions in the targeting criteria allows content providers 114 to further refine users eligible to be presented with sponsored content from a sponsored item request 344. As another example, targeting criteria may identify users having a connection to another user or object or having a particular type of connection to another user or object.

Targeting criteria may also specify one or more characteristics related to presentation conditions of the sponsored item. For example, content providers 114 may specify serving times and locations of the item. This is because sponsored items with certain subject matter (e.g., breakfast food) may be more effective at characteristic serving times in the day (e.g., morning times) or locations (e.g., near office buildings). As another example, content providers 114 may further specify the type of client device 116, e.g., mobile or desktop, on which to present the item.

The content targeting module 306 identifies a presentation opportunity for a user of a client device 116 to be presented with one or more sponsored content items, and selects one or more candidate items based on the initial targeting criteria associated with the corresponding sponsored item requests 344. The content targeting module 306 then selects a sponsored item to serve to the client device 116 through an auction process based on bid amounts associated with each candidate sponsored item request 344. The selected item is presented to the user of the client device 116.

Response Logger

Figure 4:
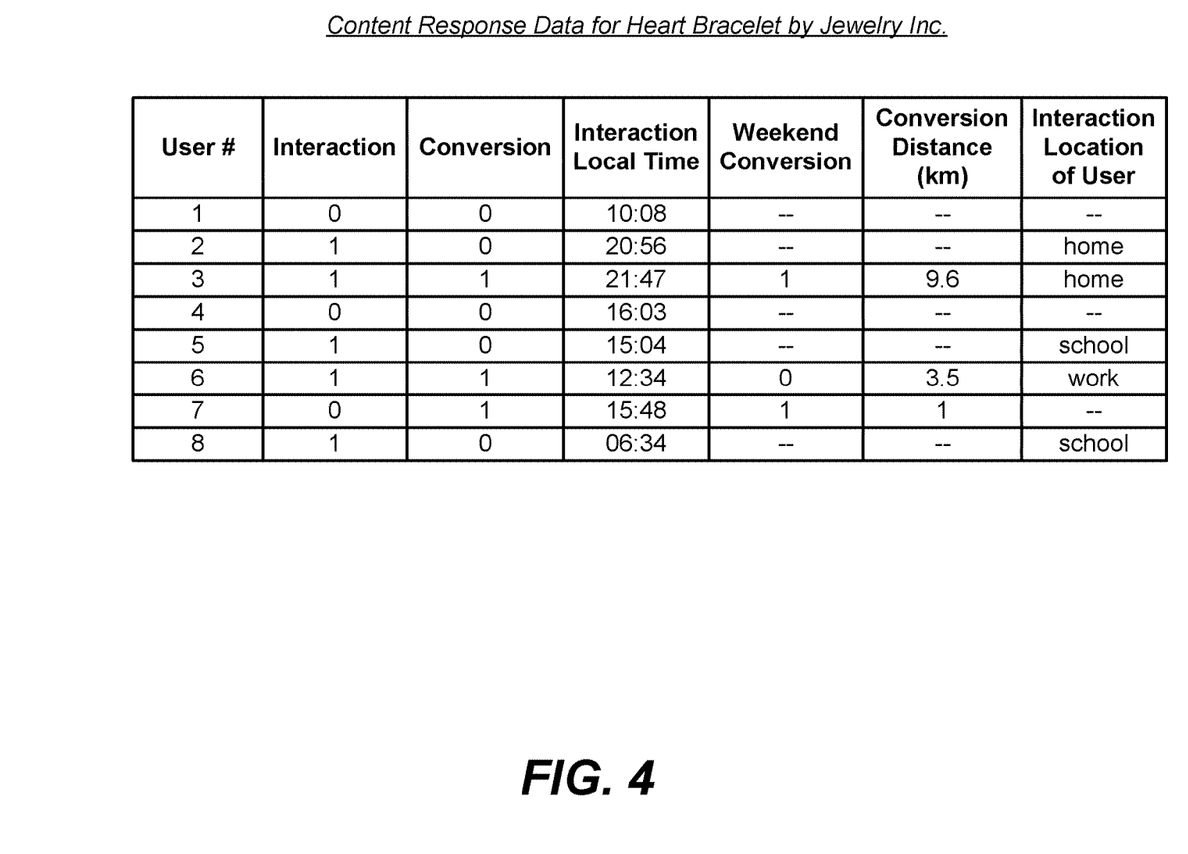
FIG. 4 illustrates an example content response data recorded by a response logger for a sponsored content item, in accordance with an embodiment.

FIG. 4 illustrates example content response data 348 recorded by a response logger 310 for a sponsored content item, in accordance with an embodiment. Specifically, the example content response data 348 in FIG. 4 is directed towards a "Heart Bracelet" manufactured by the business "Jewelry Inc." The response logger 310 receives communications on the responses of one or more users that have been presented with a particular sponsored item on their client devices 116, and populates the content response data 348 with information on the users' response to the sponsored item.

User Response

The response logger 310 records the response of a user after the user has been presented with the sponsored content item on his/her client device 116. The user response may indicate whether a user interacted with the item, whether a user converted based on the item, or whether the user remained inactive in response to the item after a predetermined length of time.

A user is said to have interacted with a sponsored content item if the user performs an action indicating engagement with the sponsored item. For example, the user may click on the item, hover the mouse pointer over the item, or view a video included in the sponsored content item, etc. As shown in FIG. 4, the example content response data 348 contains a column labeled 'Interaction,' indicating whether one or more users interacted with the received 'Heart Bracelet' sponsored item on their client devices 116.

A user is said to have converted after being presented with a sponsored content item if the user performs an action defined as being valuable to the business or organization associated with the item. For example, the user may execute an online purchase of a product promoted in the sponsored item through a third-party web site, or place a phone call to the business or entity associated with the sponsored item. As shown in FIG. 4, the example content response data 348 contains a column labeled "Conversion," indicating whether one or more users converted upon receiving the sponsored item. Although in many cases, the user interacts with the item before being converted, the user may also convert without interacting with the item, as shown in FIG. 4 for User #7. The response logger 310 may determine whether a user converted for a sponsored item by detecting the user's actions stored in the action log 252.

The user may be said to have an "active" response to the sponsored item if the user has interacted with, and/or has converted after being presented with the item. As shown in FIG. 4, Users #2, 3, 5, 6, 7, 8 may be identified as having an active response to the "Heart Bracelet" sponsored item. The user may be said to have an 'inactive' response to the item if the user has neither interacted with nor was converted by the item after a predetermined period of time. As shown in FIG. 4, Users #1 and 4 may be identified as having an inactive response to the "Heart Bracelet" sponsored content item.

Dynamic Data

The content response data 348 also contains dynamic data relating to the time or location of the client device 116 when any active user response was received from a user. For example, the response logger 310 may record the numerical time a sponsored item interacted with a user, or resulted in a conversion by a user. In one embodiment, the response logger 310 may record the local time of the user response. As shown in FIG. 4, the example content response data 348 contains a column labeled "Interaction Local Time," indicating the local times the "Heart Bracelet" sponsored item interacted with a user.

As another example, the response logger 310 may record a characteristic time of when any active user response was received from the user. The characteristic time may be a signature time of the day, week, month, year, or season. As shown in FIG. 4, the content response data 348 contains a column labeled "Weekend Conversion," indicating whether the response logger 310 detected conversion of a user for the "Heart Bracelet" product during the weekend. Other examples of characteristic times may be morning/afternoon/evening times during the day, beginning/end of a school year, seasons or holidays, etc. among many other examples.

As another example, the response logger 310 may record the proximity of a user's client device 116 to a physical location related to the sponsored content item when the active response was received for the item. The physical location may be a venue related to the business or organization associated with the sponsored item, e.g., a branch or store of a business that sells the product in the sponsored content item. Alternatively, the venue may be related to a different business or organization that can provide similar products, services, or events to that associated with the item, e.g., a jewelry store of a different brand that sells similar rings to the brand associated with the item. As shown in FIG. 4, the content response data 348 contains a column labeled "Conversion Distance (km)," indicating the proximity of each converted user to the nearest branch store of "Jewelry Inc."

As another example, the response logger 310 may record a characteristic location of the user's client device 116 when any active user response was received for the sponsored item. The characteristic location may be a category classifying the user's whereabouts. As shown in FIG. 4, the content response data 348 contains a column labeled "Interaction Location of User," indicating whether a user interacted with the "Heart Bracelet" sponsored item at home, at school, or at work. Other examples of characteristic locations may be attraction sites, such as tourist sites, popular restaurants and venues, etc. that a user may visit.

Integration Module

Figure 5:
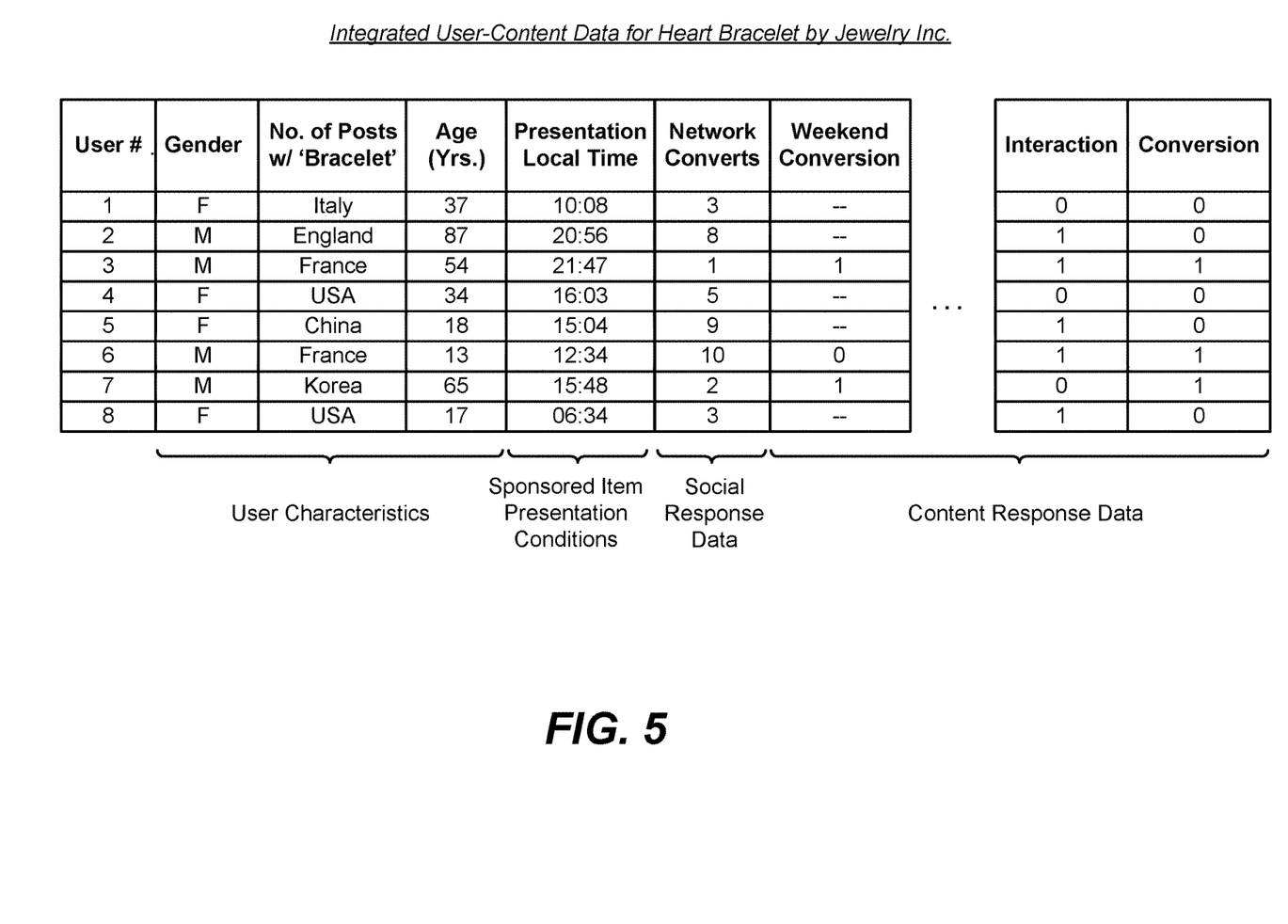
FIG. 5 illustrates example integrated user-content data collected by the integration module for a sponsored content item, in accordance with an embodiment.

FIG. 5 illustrates example integrated user-content data 352 collected by the integration module 314 for a sponsored content item, in accordance with an embodiment. For each sponsored content item, the integration module 314 combines the content response data 348 with features of user characteristics, social response data, and/or presentation conditions of the sponsored content item determined to be relevant to targeting the sponsored content item. As shown in FIG. 5, the integration module 314 collects the relevant features for each user in the content response data 348 presented with the "Heart Bracelet" sponsored item.

The user characteristics are data related to user profiles, edges, and/or actions associated with each user that may be retrieved from the user profile store 236, edge store 244, or action log 252. As shown in FIG. 5, the example integrated user-content data 352 contains columns labeled "Gender" and "Age" listing the gender and age extracted from the user profiles of each user in the content response data 348. As another example, the integrated user-content data 352 contains a column labeled "No. of Posts w/ Bracelet," indicating how many times a user generated a post on the online system 110 containing the word "Bracelet." Other examples of user characteristics for the example integrated user-content data 352 in FIG. 5 may be, but is not limited to, the number of connections or edges a user has to different jewelry businesses or the number of times a user has visited an external website associated with jewelry sales.

The social response data for a user in the integrated user-content data 352 contains responses to the sponsored content item or similar items from other users associated with the user. The other users may be associated with a user through a connection or edge in the online system 110, or may be users that the content providers 114 have identified as having similar user characteristics to the user. For example, for each user in the integrated user-content data 352, the integration module 314 may extract the number of connected users in the user's network that provided an active response to the same sponsored item or to items promoting similar subject matter. As shown in FIG. 5, the example integrated user-content data 352 contains a column labeled "Network Converts," indicating the number of connected users in a user's network that converted for the "Heart Bracelet" sponsored item. As another example, the social response data may list analytical indications such as the probability a user will generate an active response to the sponsored item identified through other users having similar user characteristics.

The sponsored item presentation conditions are characteristics, such as the time and location, related to serving of the item on a client device 116. As shown in FIG. 5, the example integrated user-content data 352 contain a column labeled "Serving Local Time," indicating the local time of the client device 116 when the "Heart Bracelet" sponsored item was presented to each user. As another example, the sponsored item presentation data may also contain the location of the client device 116 when the user was presented with the item.

Each column in the integrated user-content data 352 may be referred to as a feature of the integrated user-content data 352.

Refined Targeting Module

Figure 6:
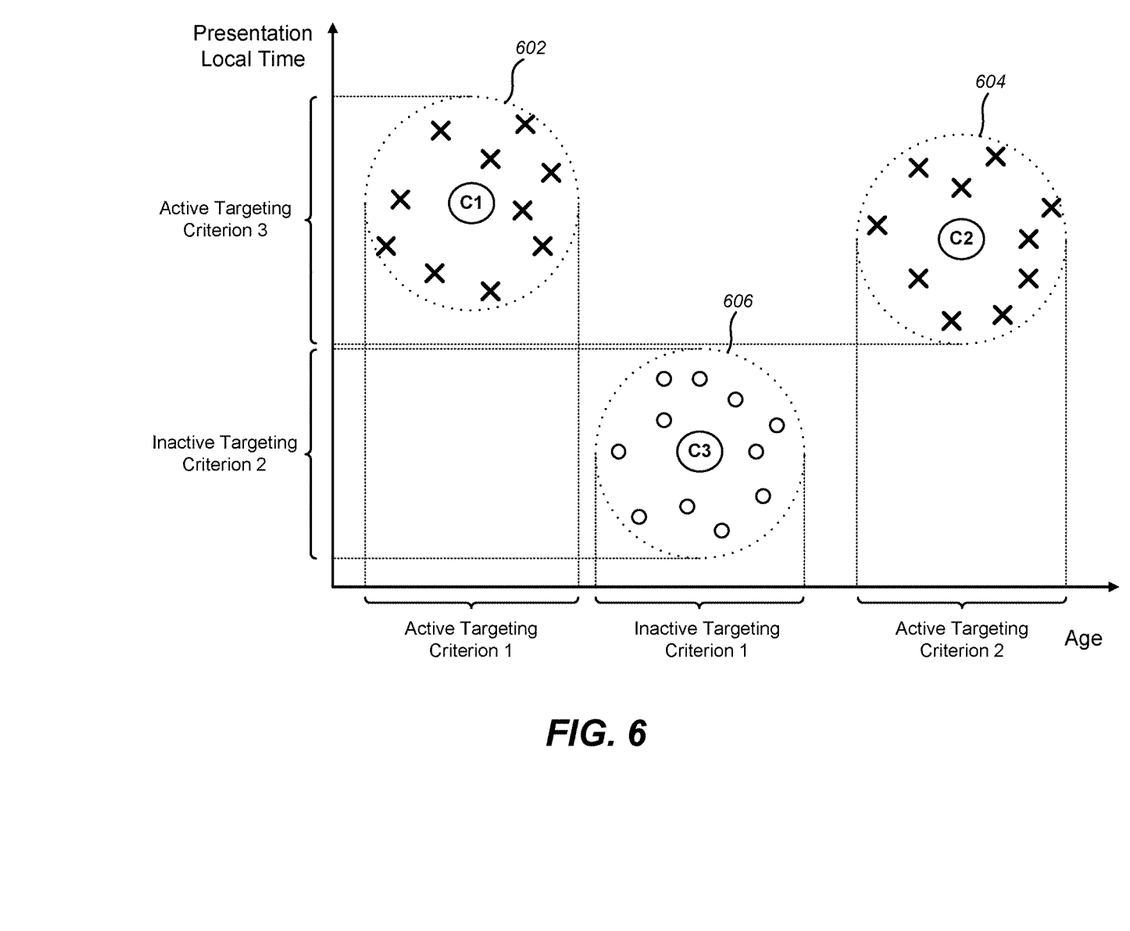
FIG. 6 illustrates example clusters generated by the refined targeting module based on the integrated user-content data, in accordance with an embodiment.

FIG. 6 illustrates example clusters generated by the refined targeting module 318 based on the integrated user-content data 352, in accordance with an embodiment.

The refined targeting module 318 receives integrated user-content data 352 for a sponsored item, identifies clusters of users based on features of integrated user-content data 352, and extracts refined targeting criteria 360 for the sponsored item based on the identified clusters. Each identified cluster is associated with a type of user response to the item. In contrast to the initial targeting criteria provided by the content providers 114 in sponsored item requests 344, the refined targeting criteria 360 is targeting criteria that takes into account content response data 348 from users who were presented with the sponsored item and their responses to the sponsored item.

The refined targeting module 318 may extract refined targeting criteria 360 by identifying clusters associated with active and/or inactive users in the feature space of the integrated user-content data 352. That is, each cluster is a set of users primarily having the same response, e.g., active/ inactive, interacted/inactive, interacted/converted/inactive, etc., that satisfies distance metric criteria in the feature space of the integrated user-content data 352. As shown in FIG. 6, cluster 602 is identified for users having an active response to the sponsored item in the numerical feature space of "Age" and time space of "Presentation Local Time" for the item. Each user classified as a member of cluster 602 may have a distance metric satisfying the criteria for the cluster. For example, each user in cluster 602 may have a distance metric from the center point "C1" of the cluster 602 equal to or less than a predetermined threshold. Similarly to cluster 602, cluster 604 is identified for a different set of users having an active response, and cluster 606 is identified for a set of users having an inactive response to the sponsored item. The refined targeting module 318 stores the identified clusters for the sponsored item in clusters 356.

In one embodiment, the refined targeting module 318 may identify the clusters 356 by the K-means algorithm, fuzzy c-means algorithm, hierarchical clustering algorithms, Gaussian mixture models, quality threshold clustering algorithms, minimum spanning tree (MST) based algorithms, kernel K-means algorithms, and density based clustering algorithms, but is not limited thereto.

The refined targeting module 318 extracts refined targeting criteria 360 based on the identified clusters 356. In one embodiment, the refined targeting module 318 identifies active targeting criteria and/or inactive targeting criteria as the refined targeting criteria 360 based on the clusters associated with each user response. In such an embodiment, active targeting criteria may be feature characteristics that are indicative of inducing an active response from a user presented with the sponsored item. In contrast, inactive targeting criteria may be feature characteristics that are indicative of inducing an inactive response from a user presented with the advertisement.

In one embodiment, various active targeting criteria and inactive targeting criteria may be identified by extracting the range of identified clusters along a feature space of the integrated user-content data 352. For example, active targeting criteria for a feature may be identified by extracting the range of clusters associated with active user responses along that feature.

As shown in FIG. 6, the refined targeting module 318 identifies "Active Targeting Criterion 1" and "Active Targeting Criterion 2" for a user's age profile based on the range of active response clusters 602 and 604 in the "Age" feature space. As another example, the retargeting module 318 identifies "Active Targeting Criterion 3" for the presentation time of the sponsored item from overlapping ranges of active response clusters 602 and 604 in the "Serving Local Time" feature space. Similarly, "Inactive Targeting Criterion 1" and "Inactive Targeting Criterion 2" are extracted from the inactive response cluster 606.

In another embodiment, the refined targeting module 318 may identify refined targeting criteria 360 for a feature by deducing the criteria from characteristics of another feature. Specifically, active targeting criteria and/or inactive targeting criteria for one feature may be deduced from extracting the range of identified clusters along another. For example, ranges extracted from active response clusters relating to dynamic data of the active user responses may be used to deduce presentation conditions for the refined targeting criteria 360. An active response cluster formed within an interaction time range of 10:00 AM-12:00 PM indicates that the active targeting criteria should include a presentation time criteria within this extracted time frame. As another example, an active response cluster formed within a conversion location of 0-10 km from a branch store of "Jewelry Inc." indicates that the active targeting criteria should include a presentation location criteria for targeting users located within this extracted distance range.

The refined targeting module 318 provides the refined targeting criteria 360 to the content targeting module 306, such that the content targeting module 306 may target the sponsored item based on the refined targeting criteria 360.

Upon receiving the refined targeting criteria 360 from the refined targeting module 318, the content targeting module 306 may target the sponsored content item to users based on the user characteristics, presentation conditions, and social response data identified in the refined targeting criteria 360.

In one embodiment, the content targeting module 306 may target the sponsored item to users meeting the active targeting criteria. Returning to FIG. 6, the content targeting module 306 may target the sponsored item to users within the age range identified as "Active Targeting Criterion 1" and "Active Targeting Criterion 2." As another example, the content targeting module 306 may target the sponsored item at times identified in "Active Targeting Criterion 3." Moreover, the content provider system 212 may increase the required bid amount for targeting the sponsored item on opportunities meeting the active targeting criteria.

In another embodiment, the content targeting module 306 may avoid targeting the sponsored item to users meeting the inactive targeting criteria. Returning to FIG. 6, the content targeting module 306 may avoid targeting the sponsored item to users within the age range identified as "Inactive Targeting Criterion 1," and may avoid targeting the item at times identified in "Inactive Targeting Criterion 2."

In one embodiment, the content provider system 212 may continuously and automatically update the refined targeting criteria 360 for the particular sponsored content item by collecting user responses from new groups of users presented with the sponsored content item. For example, as discussed above, the sponsored item may be presented to a group of users that meet the active targeting criteria identified by the refined targeting module 318, different from the users identified by the initial targeting criteria provided by the content providers 114. Updated content response data 348 containing the user responses of these users may now be used to construct updated clusters 356 and updated refined targeting criteria 360 to improve targeting of the sponsored content item. In this way, the online system can refine targeting criteria provided by a content provider 114 for a particular piece of sponsored content to perform more accurate targeting for that particular content and determine an optimal audience specific to the content.

Figure 7:
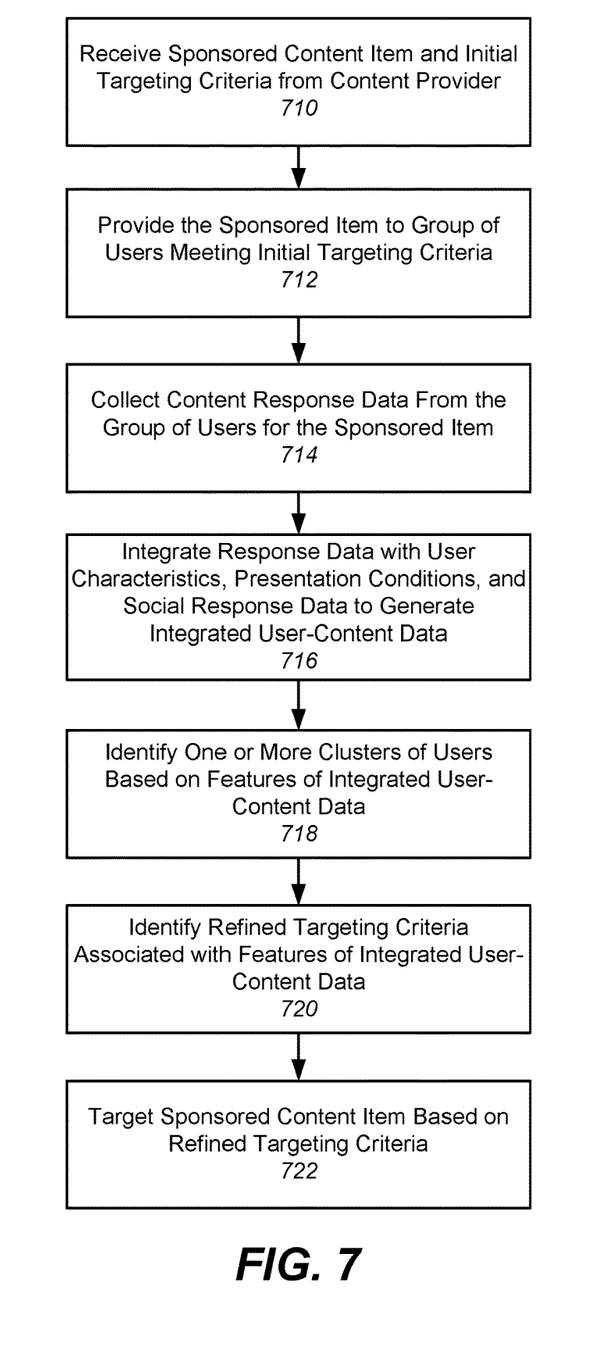
FIG. 7 is a flowchart illustrating a process of a content provider system generating refined targeting criteria for a sponsored item based on collected content response data, and using the refined targeting criteria to target the item, in accordance with an embodiment.

FIG. 7 is a flowchart illustrating a process of a content provider system generating refined targeting criteria for a sponsored item based on collected content response data, and using the refined targeting criteria to target the item.

The online system receives 710 a sponsored content item and initial targeting criteria from the content provider. The initial targeting criteria may include a set of rules related to user characteristics or serving time/location of the sponsored item. The item is provided 712 to a group of users meeting the initial targeting criteria. The content response data from the group of users is collected 714. The content response data includes user responses to the sponsored item, as well as dynamic data relating to time and location of the user responses.

The content response data is integrated 716 with corresponding user characteristics, presentation conditions, and social response data to generate integrated user-content data.

The user characteristics are related to the profile of the user, actions associated with the user and user connections to other users or objects on the online system. The presentation conditions are conditions related to when the sponsored item was presented to the user. The social response data is related to the responses of users that are associated with the group of users presented with the sponsored item.

One or more clusters of users are identified 718 based features of the integrated user-content data. Each cluster is associated with a type of user response, e.g., active or inactive. Based on the clusters, a refined targeting criterion is identified 720 for the sponsored item. Active targeting criteria may be identified from clusters associated with active user responses, and inactive targeting criteria may be identified from clusters associated with inactive user responses. The sponsored content item is targeted 722 based on the refined targeting criteria. For example, the item may be provided to another group of users who meet the active targeting criteria, and avoided for users who meet the inactive targeting criteria.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving, at an online system, a sponsored content item and initial targeting criteria from a content provider, the initial targeting criteria comprising a set of rules for targeting the sponsored content item to users of the online system;

providing, over a period of time, the sponsored content item for display to a first group of users of the online system meeting the initial targeting criteria;

collecting content response data on the sponsored content item from the first group of users, the content response data comprising user responses of the first group of users to the sponsored content item and dynamic data relating to time and location of the user responses, wherein the dynamic data comprises proximity of a user to a physical location related to the sponsored content item at a time of the user response for the user, or a characteristic time of day, week, month, year, or season of the user response;

integrating the content response data with corresponding user characteristic data, presentation conditions of the sponsored content item, and social response data to generate integrated user-content data for the sponsored content item, the user characteristic data comprising features relating to a user profile of and actions of the user in the online system, the presentation conditions comprising features relating to presentation times and locations of the sponsored content item, and the social response data comprising features relating to responses of other users associated with the first group of users to the sponsored content item;

identifying, by the online system for the sponsored content item, one or more clusters of users based on the features of the integrated user-content data, each of the one or more clusters being specific to the sponsored content item and being associated with a type of user response to the sponsored content item;

identifying, by the online system for the sponsored content item, refined targeting criteria associated with a set of features of the integrated user-content data based on the one or more clusters identified for the sponsored content item, wherein identifying the refined targeting criteria further comprises extracting a range of a cluster in the one or more clusters along a feature relating to the proximity of the user to the physical location or the characteristic time; and targeting the sponsored content item to additional users of the online system meeting the refined targeting criteria for the sponsored content item.

2. The method of claim 1, wherein the sponsored content item is any one of a series of sponsored content items in a campaign.

3. The method of claim 1, wherein the type of user responses comprise active user responses for users that interacted with or converted based on the sponsored content item, and inactive user responses for users that did not interact with or did not convert based on the sponsored content item.

4. The method of claim 3, wherein identifying the refined targeting criteria comprises identifying active targeting criteria from clusters associated with the active user responses, and wherein targeting the sponsored content item based on the refined targeting criteria comprises providing the sponsored content item to a second group of users meeting the active targeting criteria.

5. The method of claim 3, wherein identifying the refined targeting criteria comprises identifying inactive targeting criteria from clusters associated with the inactive user responses, and wherein targeting the sponsored content item based on the refined targeting criteria comprises targeting the sponsored content item to a second group of users that do not meet the inactive targeting criteria.

6. The method of claim 1, wherein identifying the refined targeting criteria further comprises extracting another range of another cluster in the one or more clusters along another feature in the set of features.

7. The method of claim 1, wherein the users associated with the first group of users are users connected to the first group of users through edges in a social networking system.

8. The method of claim 7, wherein the social response data comprises a number of users connected to the first group of users having an active response to the sponsored content item.

9. The method of claim 1, wherein the users associated with the first group of users are users identified to have user characteristics similar to the first group of users.

10. The method of claim 1, wherein the one or more clusters are identified using a K-means clustering algorithm or a Gaussian mixture algorithm.

11. A computer program product comprising a non-transitory computer-readable storage medium containing computer program code for:
receiving, at an online system, a sponsored content item and initial targeting criteria from a content provider, the initial targeting criteria comprising a set of rules for targeting the sponsored content item to users of the online system;
providing, over a period of time, the sponsored content item for display to a first group of users of the online system meeting the initial targeting criteria;
collecting content response data on the sponsored content item from the first group of users, the content response data comprising user responses of the first group of users to the sponsored content item and dynamic data relating to time and location of the user responses, wherein the dynamic data comprises proximity of a user to a physical location related to the sponsored content item at a time of the user response for the user, or a characteristic time of day, week, month, year, or season of the user response;
integrating the content response data with corresponding user characteristic data, presentation conditions of the sponsored content item, and social response data to generate integrated user-content data for the sponsored content item, the user characteristic data comprising features relating to a user profile of and actions of the user in the online system, the presentation conditions comprising features relating to presentation times and locations of the sponsored content item, and the social response data comprising features relating to responses of other users associated with the first group of users to the sponsored content item;
identifying, by the online system for the sponsored content item, one or more clusters of users based on the features of the integrated user-content data, each of the one or more clusters being specific to the sponsored content item and being associated with a type of user response to the sponsored content item;
identifying, by the online system for the sponsored content item, refined targeting criteria associated with a set of features of the integrated user-content data based on the one or more clusters identified for the sponsored content item, wherein identifying the refined targeting criteria further comprises extracting a range of a cluster in the one or more clusters along a feature relating to the proximity of the user to the physical location or the characteristic time; and
targeting the sponsored content item to additional users of the online system meeting the refined targeting criteria for the sponsored content item.

12. The computer product program of claim 11, wherein the sponsored content item is any one of a series of sponsored content items in a campaign.

13. The computer product program of claim 11, wherein the type of user responses comprise active user responses for users that interacted with or were converted based on the sponsored content item, and inactive user responses for users that did not interact with or were not converted based on the sponsored content item.

14. The computer product program of claim 13, wherein identifying the refined targeting criteria comprises identifying active targeting criteria from clusters associated with the active user responses, and wherein targeting the sponsored content item based on the refined targeting criteria comprises providing the sponsored content item to a second group of users meeting the active targeting criteria.

15. The computer product program of claim 13, wherein identifying the refined targeting criteria comprises identifying inactive targeting criteria from clusters associated with the inactive user responses, and wherein targeting the sponsored content item based on the refined targeting criteria comprises targeting the sponsored content item to a second group of users that do not meet the inactive targeting criteria.

16. The computer product program of claim 11, wherein identifying the refined targeting criteria further comprises extracting another range of another cluster in the one or more clusters along another feature in the set of features.

17. The computer product program of claim 11, wherein the users associated with the first group of users are users connected to the first group of users through edges in a social networking system.

18. The computer product program of claim 17, wherein the social response data comprises a number of users connected to the first group of users having an active response to the sponsored content item.

19. The computer product program of claim 11, wherein the users associated with the first group of users are users identified to have user characteristics similar to the first group of users.

20. The computer product program of claim 11, wherein the one or more clusters are identified using a K-means clustering algorithm, or a Gaussian mixture algorithm.

21. A system comprising:
a processor configured to execute instructions;
a non-transitory computer-readable medium containing instructions for execution on the processor, the instructions causing the processor to perform steps of:
receiving, at an online system, a sponsored content item and initial targeting criteria from a content provider, the initial targeting criteria comprising a set of rules for targeting the sponsored content item to users of the online system;
providing, over a period of time, the sponsored content item for display to a first group of users of the online system meeting the initial targeting criteria;
collecting content response data on the sponsored content item from the first group of users, the content response data comprising user responses of the first group of users to the sponsored content item and dynamic data relating to time and location of the user responses, wherein the dynamic data comprises proximity of a user to a physical location related to the sponsored content item at a time of the user response for the user, or a characteristic time of day, week, month, year, or season of the user response;
integrating the content response data with corresponding user characteristic data, presentation conditions of the sponsored content item, and social response data to generate integrated user content data for the sponsored content item, the user characteristic data comprising features relating to a user profile of and actions of the user in the online system, the presentation conditions comprising features relating to presentation times and locations of the sponsored content item, and the social response data comprising features relating to responses of other users associated with the first group of users to the sponsored content item;
identifying, by the online system for the sponsored content item, one or more clusters of users based on the features of the integrated user content data, each of the one or more clusters being specific to the sponsored content item and being associated with a type of user response to the sponsored content item;
identifying, by the online system for the sponsored content item, refined targeting criteria associated with a set of features of the integrated user-content data based on the one or more clusters identified for the sponsored content item, wherein identifying the refined targeting criteria further comprises extracting a range of a cluster in the one or more clusters along a feature relating to the proximity of the user to the physical location or the characteristic time; and
targeting the sponsored content item to additional users of the online system meeting the refined targeting criteria for the sponsored content item.

22. The system of claim 21, wherein the sponsored content item is any one of a series of sponsored content items in a campaign.

23. The system of claim 22, wherein the type of user responses comprise active user responses for users that interacted with or converted based on the sponsored content item, and inactive user responses for users that did not interact with or did not convert based on the sponsored content item.

24. The system of claim 23, wherein identifying the refined targeting criteria comprises identifying active targeting criteria from clusters associated with the active user responses, and wherein targeting the sponsored content item based on the refined targeting criteria comprises providing the sponsored content item to a second group of users meeting the active targeting criteria.

25. The system of claim 23, wherein identifying the refined targeting criteria comprises identifying inactive targeting criteria from clusters associated with the inactive user responses, and wherein targeting the sponsored content item based on the refined targeting criteria comprises targeting the sponsored content item to a second group of users that do not meet the inactive targeting criteria.

26. The system of claim 21, wherein identifying the refined targeting criteria further comprises extracting another range of another cluster in the one or more clusters along another feature in the set of features.

27. The system of claim 25, wherein the users associated with the first group of users are users connected to the first group of users through edges in a social networking system.

28. The system of claim 27, wherein the social response data comprises a number of users connected to the first group of users having an active response to the sponsored content item.

29. The system of claim 25, wherein the users associated with the first group of users are users identified to have user characteristics similar to the first group of users.

30. The system of claim 25, wherein the one or more clusters are identified using a K-means clustering algorithm or a Gaussian mixture algorithm.

* * * * *